US005599059A

United States Patent [19]
Shann

[11] Patent Number: 5,599,059
[45] Date of Patent: Feb. 4, 1997

[54] VEHICLE SUNROOF MODULE

[75] Inventor: Paul T. E. Shann, Clarkston, Mich.

[73] Assignee: Chrysler Corporation, Auburn Hills, Mich.

[21] Appl. No.: 537,377

[22] Filed: Oct. 2, 1995

[51] Int. Cl.⁶ ...................................................... B60J 7/00
[52] U.S. Cl. ............................................ 296/216; 280/748
[58] Field of Search .................................... 296/216, 214; 280/748, 751

[56] References Cited

U.S. PATENT DOCUMENTS

| 1,534,377 | 4/1925 | Furiate . | |
|---|---|---|---|
| 2,352,727 | 7/1944 | McMahon . | |
| 2,907,602 | 10/1959 | Lagerling . | |
| 3,016,263 | 1/1962 | Rehmann | 296/216 |
| 4,159,144 | 6/1979 | Ehlen et al. | 296/216 X |
| 4,175,785 | 11/1979 | Leiter . | |
| 4,892,351 | 1/1990 | Ono et al. | 296/213 |
| 4,969,681 | 11/1990 | Schleicher et al. | 296/216 X |
| 5,163,732 | 11/1992 | Schurmann | 296/223 |

FOREIGN PATENT DOCUMENTS

| 188837 | 7/1986 | European Pat. Off. | 296/216 |
|---|---|---|---|
| 315516 | 5/1989 | European Pat. Off. | 296/216 |
| 1260056 | 3/1961 | France | 280/748 |
| 2577175 | 8/1986 | France | 296/216 |
| 3413226 | 8/1985 | Germany | 296/216 |
| 3644492 | 7/1987 | Germany | 296/216 |
| 39319 | 2/1987 | Japan | 296/216 |
| 676981 | 8/1952 | United Kingdom | 280/751 |

Primary Examiner—Dennis H. Pedder
Attorney, Agent, or Firm—Thomas G. Pasternak

[57] ABSTRACT

In a sunroof module structure for an opening in a vehicle roof which incorporates a sunroof glass panel adapted to be moved between a forward position for closing the opening and an aft position for exposing the opening. The module includes front and intermediate crossmembers which, together with a pair of longitudinal panel guide rails, define the roof opening area. The module further includes a rear crossmember which, together with the intermediate crossmember and the pair of longitudinal guide rails, define an area for storage of the glass panel. The frame has a plurality of resiliently-loaded fastener assemblies each connected to an associated underlying portion of the module. Upon an occupant of the vehicle striking the module, a resilient member of at least one fastener assembly being compressed absorbing at least a portion of the resultant impact force exerted by the occupant.

5 Claims, 3 Drawing Sheets

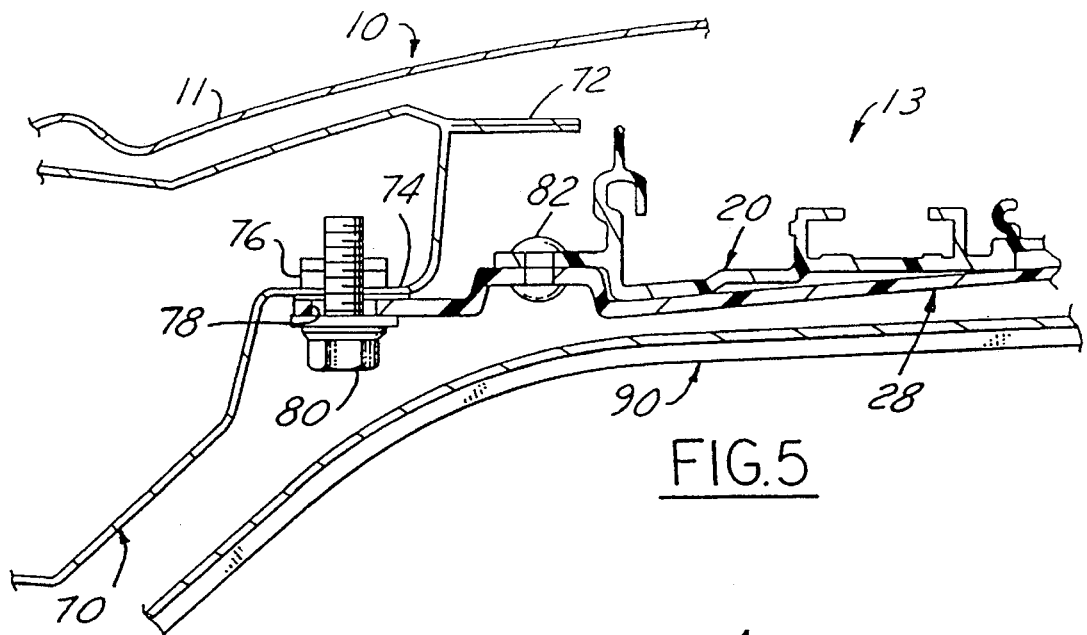

VEHICLE SUNROOF MODULE

FIELD OF THE INVENTION

This invention relates generally to vehicle sunroof construction and, more particularly, to a vehicle modular sunroof adapted for absorbing impact energy to protect occupants of the vehicle passenger compartment in case of an accident.

Various vehicle body passenger compartment patents deal with arrangements for the protection of passengers from injury in the event of a collision. An example of one form of occupant impact protector is a safety windshield shown in U.S. Pat. No. 2,352,727 issued Jul. 4, 1944 to McMahon. The McMahon patent discloses an automobile windshield normally secured by a plurality of shock-absorbing hinged spring retaining devices that maintain the windshield frame seated on the vehicle body. The devices are yieldably operable, when force is applied to the windshield from within the body, to release the windshield from its mounting and partially or completely from the devices, depending on the force exerted.

SUMMARY OF THE INVENTION

During a vehicle accident, the occupants of a vehicle may impact interior portions of a vehicle sunroof with their upper torso or head. In an effort to reduce injuries from impacting the vehicle interior, the Federal Government has proposed regulations requiring energy absorbing features to reduce the impact force experienced by the occupants and thus eliminate or minimize injury.

The present invention provides an energy absorbing vehicle sunroof module arrangement wherein a plurality of resiliently-loaded energy absorbing fastener assemblies each connect an internal reinforcement frame, bordering a vehicle roof opening, to the subjacent sunroof module. In one form of the invention, each energy absorbing fastener assembly includes a compression coil spring, concentrically disposed about a vertically disposed sleeved bolt, wherein an upper end of the spring abuts an undersurface of the frame and the spring lower end abuts an upper surface of the module. Each coil spring is adapted to absorb the energy of a force exerted by an occupant striking the sunroof closed glass panel or adjacent areas of the vehicle headliner covering the module support structure. Compression of at least one of the springs results in leveraged deformation of a rear rivet fastener and\or a sheet metal portion of a body upper side box-beam structure bolted to an aft portion of the module, thereby allowing upward pivoting movement of forward portion of the module.

Another feature of the present invention includes a resiliently-loaded fastener assembly wherein an elastomeric member is used in place of the coiled compression spring and metal spacer sleeve discussed above. In one form, an elastomeric tubular member encircles the threaded bolt, with its upper end contacting an undersurface of the reinforcement frame and its lower end contacting an upper surface of the module.

These and other features and advantages of the invention will be more fully understood from the following detailed description of the invention taken together with the accompanying drawings.

BRIEF DESCRIPTION OF THE DRAWINGS

In the drawings:

FIG. 5 is an enlarged fragmentary vertical cross sectional view taken on the line 5—5 of FIG. 1;

FIG. 6 is an enlarged perspective detail view of the roof opening reinforcement frame, shown in FIG. 1;

FIG. 7 is an enlarged fragmentary vertical cross sectional view taken on the line 7—7 of FIG. 6;

FIG. 8 is an enlarged fragmentary vertical cross sectional view taken on the line 8—8 of FIG. 6; and FIG. 9 is a fragmentary vertical sectional view of an alternative embodiment of the resiliently-biased fastener assembly shown in FIGS. 3 and 4.

DETAILED DESCRIPTION OF THE INVENTION

Figure 1:
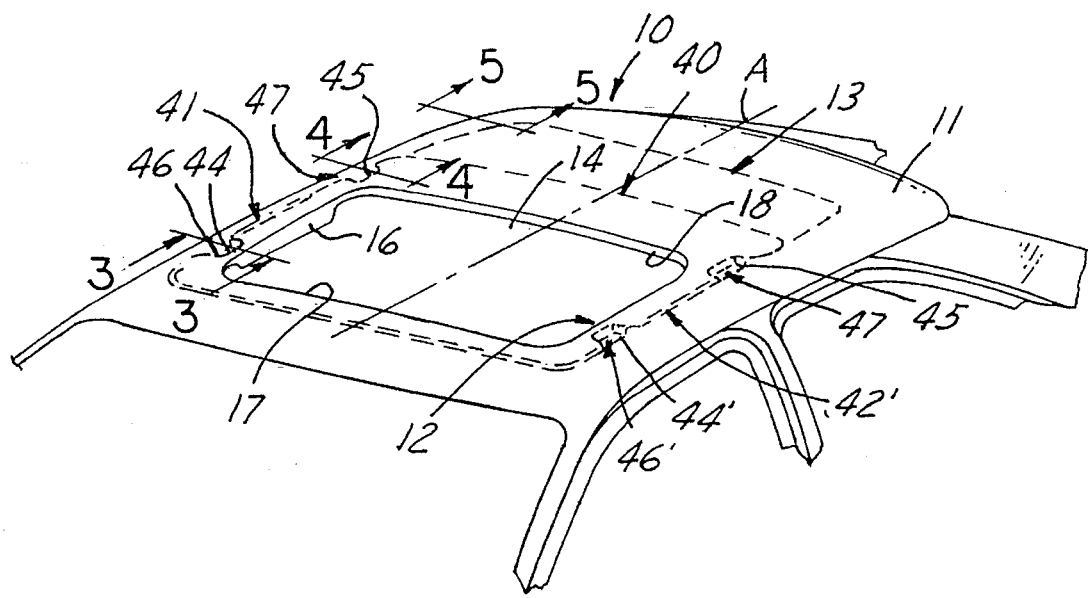
FIG. 1 is a fragmentary perspective view of a motor vehicle roof provided with a sunroof structure in accordance with the present invention.
Figure 3:
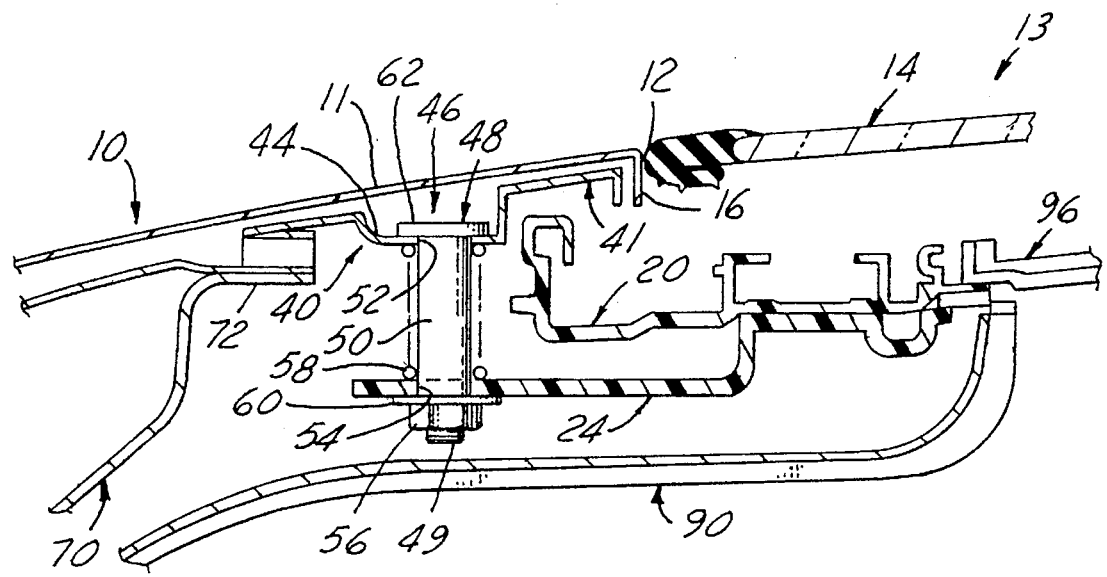
FIG. 3 is an enlarged fragmentary vertical cross sectional view taken on the line 3—3 of FIG. 1.
Figure 4:
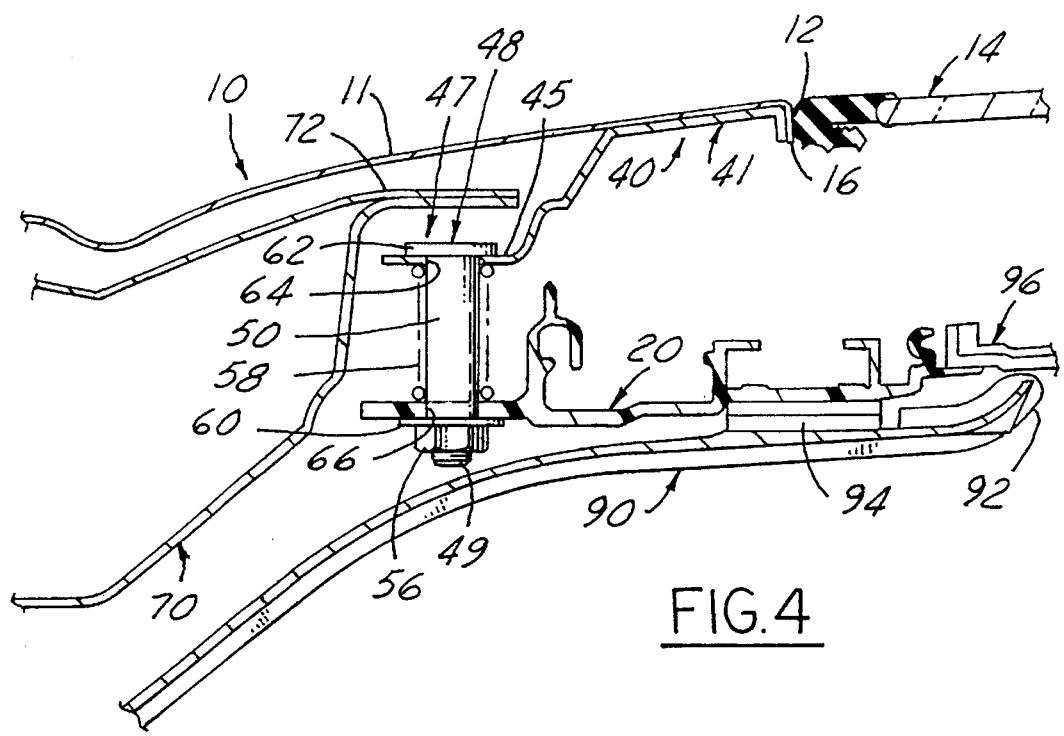
FIG. 4 is an enlarged fragmentary vertical cross sectional view taken on the line 4—4 of FIG. 1.

Referring now to the drawings, and in particular to FIG. 1, numeral 10 generally indicates a vehicle body roof structure including a sheet metal roof panel 11, formed with a sunroof rectangular-shaped opening 12. A sunroof module housing structure, generally indicated by dashed lines at 13, consists of a glass panel 14, shown in FIG. 3 its closed position covering the opening 12. FIGS. 3 and 4 depict the roof opening 12 defined by side flanges 16, together with front 17 and rear 18 transverse flanges respectively, bent downward from the roof panel 11. The sunroof module structure 13 is symmetrically disposed about a longitudinal plane of symmetry which includes the body longitudinal axis "A" of FIG. 1.

Figure 2:
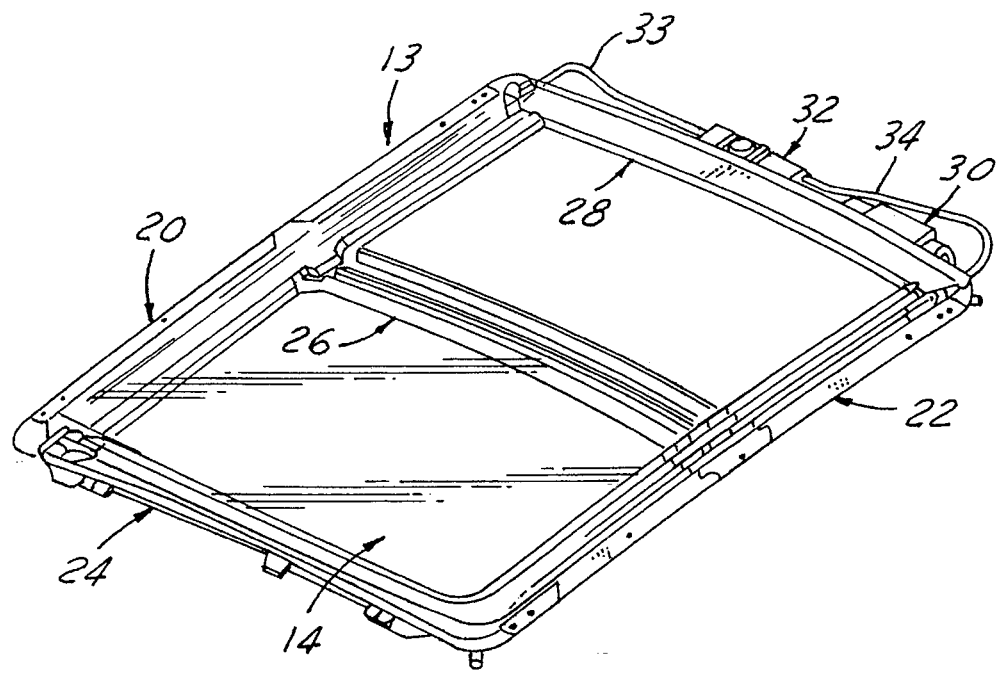
FIG. 2 is a perspective view of the sunroof modular assembly of the FIG. 1 roof.

As seen in FIG. 2, the modular sunroof structure 13 includes a pair of longitudinally extending mirror image right 20 and left 22 guide rails adapted to guide the glass panel 14 between its forward position, closing the roof opening 12, and its rearward stored position, exposing the roof opening. The sunroof module structure 13 further includes a front crossmember 24, an intermediate crossmember 26, and a rear crossmember 28 each having its outboard ends suitably secured to the an associated guide rail 20 and 22. It will be noted that in the disclosed embodiment the front and rear crossmembers are of plastic material while the intermediate crossmember 26 is of metal such as steel, for example.

A sunroof control module 30 and an electric drive motor 32 are attached to the support flanges of rear cross member 28. When the motor 32 is energized, right hand 33 and left hand 34 push-pull cables are pushed or pulled, depending on the direction of rotation of the motor 32, so as to move the glass panel 14 along the guide rails 20 and 22 in a conventional manner.

With reference to FIGS. 1 and 6, numeral 40 generally indicates a rectangular-shaped internal stationary roof reinforcement frame. The frame 40, formed from sheet metal, is mounted about the periphery of the roof opening 12 and is suitably affixed to an underside of the roof 11, as by welding. It will be noted in FIGS. 1, 2 and 6 that as the right and left half portions of the module structure 13 and the reinforcement frame 40 are mirror images, therefore only the right side will be shown and discussed in detail with the corresponding left side elements being denoted by the same reference numerals except that they are primed.

Referring to FIGS. 3, 4, and 6, the reinforcement frame includes right 41 and left 41' side members, a front transverse member 42, and an aft transverse member 43. The right side member is shown formed with forward 44 and aft 45 depressions for receiving identical front (FIG. 3) and rear (FIG. 4) spring-loaded connections 46 and 47. FIG. 1 shows the left side frame member 41' formed with mirror image front 44' and rear 45' depressions for mounting a left side pair of identical front 46' and rear 47' spring-loaded fastener assemblies. As the fastener assemblies are identical, only the right side fastener assemblies 46 and 47 are shown and described.

As indicated in FIG. 3, each spring-loaded front bolt assembly 46 includes a vertically disposed bolt 48 having a threaded stem 49 encircled by a concentric spacer sleeve 50. The bolt stem 49 and spacer sleeve 50 are shown extending through an upper depression hole 52 and an aligned front crossmember lower hole 54. A nut 56 is threaded on the bolt stem lower end and, upon being tightened, the sleeve 50 is compressed between the bolt head 62 and a bolt washer 60 thereby maintaining a predetermined dimension therebetween. The sleeve 50 is concentrically surrounded by a helical coiled compression spring 58, of round spring steel, which biases the crossmember 24 against bolt washer 60 and the depression 44 against bolt head 62 in the normal compressed state of spring 58.

Viewing FIGS. 4 and 1, spring loaded connection 47, which includes an identical intermediate bolt 48 and spacer sleeve 50, is shown connecting rear reinforcement bolt hole 64 of depression 45 with an aligned bolt hole 66 in the right side guide rail 20. The intermediate sleeve 50 is concentrically surrounded by a coiled compression spring 58 which biases the guide rail 20 against a bolt washer 60 and the depression 45 against rear bolt head 62 in the normal compression state of rear spring 58.

With reference to FIG. 5, body upper longitudinal roof box beam 70, formed with an inboard projecting pinch-flange 72, has a horizontal shoulder 74 receiving a weld nut 76. The rear plastic crossmember 28 has its outboard end provided with a bolt hole 78 receiving threaded machine bolt 80 therethrough for threaded engagement in weld nut 76. The plastic rear cross member 28 right side portion is shown secured to an aft end of the right side rail 20 by a rivet fastener 82.

FIG. 4 shows a vehicle headliner 90 formed with a rectangular opening 92, aligned with the vehicle sunroof closed glass panel 14, with the headliner suitably supported on the underside of the guide rail 20 by suitable fasteners such as a Velcro fastener shown at 95. A slidable sunshade is partially shown at 96 adapted, when closed, to conceal the glass panel 14 from the interior of the vehicle and reduce direct sunlight and heat in the vehicle.

With reference to FIGS. 3, 4, and 5, it will be appreciated that the front 46, 46' and rear 47, 47' pair of spring-loaded connector bolt assemblies cooperate with the sunroof module and associated body structure to provide an energy absorbing arrangement. In a first instance, the arrangement is adapted for absorbing a force caused by a vehicle occupant directly striking the module 20 or, in a second instance, striking the headliner 90 subjacent the module and thereafter the module. It will be noted in FIG. 3, for example, that upon a vehicle right hand front seat occupant striking the headliner 90, the headliner is driven upwardly into direct contact with the right side rail 20 or into direct contact with a right hand portion of the front crossmember 24. As a consequence, the spring-loaded connection 46 will have its helical spring 58 compressed thereby absorbing an initial impact of the occupant.

As a result of one or more of the coil springs 58 being compressed, the front portion of the side rail 20 will move upwardly causing the aft end of one or both of the side rails 20 and 22 to pivot relative to the rear plastic crossmember 28. It will be seen in FIG. 5 that upon a forward portion of the guide rail 20 being forced upwardly a leverage force is applied to the rear rivet fastener 82, causing the rivet to deform when the forward end of the guide rail 20 pivots upwardly. If the crossmember 28 is formed of a tougher plastic material or of metal, however, it will be appreciated that a larger reactive force will be applied to the machine bolt 80. This may result in the sheet metal shoulder portion 74 of the box-beam 70 deforming either prior to or instead of the rivet 82. In any case, the resultant upward pivoting of the front portion of the module guide rail 20 and/or 22 further minimizes injury to an occupant impacting the sunroof module.

It will be understood that such upward pivoting of the sunroof module occurs when the glass panel 14 is in its forward closed position, rather than in its rearward stored mode wherein the roof opening is in its open exposed mode. This can be explained by the fact that the rearward positioned stored glass panel imparts substantial rigidity to the aft portion of the module thereby obviating significant deformation of the module of its connected vehicle body structure.

Referring to FIG. 9, the numeral 92 generally indicates an alternative embodiment of a resiliently-loaded fastener assembly. As the fastener assembly 92 is similar to the fastener assembly shown in FIG. 3, corresponding numerals will be used to describe like or corresponding elements with the exception that the numerals will be primed. The fastener assembly 92 includes a vertically disposed bolt 48' having a threaded stem 49' encircled by a concentric spacer sleeve 50'. A tubular resilient spacer 94 formed of elastomeric material such as rubber surrounds the sleeve 50' and is compressed between the upper frame depression 44' and the front crossmember 24'. The bolt stem 49' and spacer sleeve 50' extend through an upper depression hole 52' and an aligned front crossmember lower hole 54'. A nut 56' is threaded on the stem lower end and, upon being tightened, the tubular spacer 94 is initially pre-compressed thereby maintaining the crossmember spaced at a predetermined vertical dimension from the upper frame depression 44'. The compressed tubular spacer 94 biases the crossmember 24' against bolt washer 60' and the depression 44' against the bolt head 62' in the pre-compressed state of the tubular elastomer spacer.

It will be seen that, upon the crossmember being impacted by an occupant, the resilient spacer 94 will be further compressed to absorb at least a portion of the impact energy imparted by the occupant on the sunroof module 13 in the same manner as the coiled spring 58 of the embodiment of FIGS. 1–8.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined but the language of the following claims.

What is claimed is:

1. In combination with a vehicle body having a passenger compartment and upper body portions supporting a roof formed with an opening over the passenger compartment, a reinforcement frame mounted on an underside of the roof about the periphery of the opening, and a sunroof module having a pair of longitudinally extending side guide rails for guiding the motion of a glass panel between a forward position, closing the opening, and an aft stored position, exposing the opening, the improvement wherein:

said module includes a front and a rear crossmember which, together with said rails, define a module portion underlying a roof area which includes said roof opening, and wherein said rear and an intermediate crossmember, together with said rails, define a storage area for the panel;

said frame has a plurality of energy absorbing resilient fastener assemblies connected to said underlying module portion, and said rear crossmember has each end thereof fixedly connected by a rear fastener to an associated fixed support;

said fastener assemblies each having a bolt and nut assembly including spacer means formed by a tubular sleeve surrounding a stem of said bolt and against which the nut is tightened, and a preloaded resilient member surrounding said bolt and biasing said module away from said frame, said resilient member adapted to be further compressed for at least partially absorbing the energy of a predetermined internal impact upon the sunroof module.

2. The combination of claim 1 wherein said bolt stem is generally vertically disposed and with said sleeve extends through a hole in said frame and an aligned hole in said underlying portion of said module, said nut, when tightened against said sleeve, limits said module portion to a predetermined maximum vertically spaced relation with said reinforcement frame, and said resilient member is in the form of a helical coiled compression spring concentrically surrounding said bolt stem and sleeve, wherein an upper end of said spring contacts an undersurface of an overlying frame side member and a lower end of said spring contacts an opposed surface of said underlying module portion.

3. The combination of claim 1 wherein said frame has longitudinally extending side members with opposite front and rear portions thereof each being connected by one of said fastener assemblies to said underlying portion of said module.

4. The combination of claim 1 wherein said frame has longitudinally extending side members with opposite front portions of each said side member connected by one of said fastener assemblies to an underlying outboard one end of said front crossmember, and wherein opposite rear portions of each said side member are connected by one of said fastener assemblies to an underlying portion of an associated guide rail.

5. The combination of claim 1 wherein said bolt stem is generally vertically disposed and with said sleeve extends through a hole in said frame and an aligned hole in said underlying portion of said module, said nut, when tightened against said sleeve, limits said module portion to a predetermined maximum vertically spaced relation with said frame and said resilient member is a tubular member of elastomeric material surrounding said bolt stem wherein an upper end of said tubular member contacts an undersurface of an overlying frame side member and a lower end of said tubular member contacts an opposed surface of said module portion.

* * * * *